UNITED STATES PATENT OFFICE.

HENRI RAYMOND VIDAL, OF PARIS, FRANCE.

THIAZIN DYE.

SPECIFICATION forming part of Letters Patent No. 594,107, dated November 23, 1897.

Application filed July 24, 1897. Serial No. 645,860. (Specimens.) Patented in France February 27, 1897, No. 264,510, and in England March 3, 1897, No. 5,691.

*To all whom it may concern:*

Be it known that I, HENRI RAYMOND VIDAL, of Paris, France, have invented new and useful Improvements in Methods of Preparing the Coloring-Matters Paradioxythiazin and Paramidoöxythiazin, (for which I have obtained patents in France, No. 264,510, dated February 27, 1897, and in England, No. 5,691, dated March 3, 1897,) which are clearly described in the following specification.

In heating paramidophenol with sulfur a liberation of ammonia is produced, which intervenes in the operation by reacting upon the paradioxythiazin formed in order to condense it, molecule by molecule, and give paradioxytetraphenetrithiazin. In this reaction it is not possible to isolate more than very small quantities of paradioxythiazin.

I have found that by causing sulfur to react upon equal parts of paramidophenol and hydroquinone, the ammonia liberated by the action of the sulfur upon the paramidophenol, exerted in presence of the sulfur its action upon the hydroquinone so as to give paradioxythiazin upon its own account also. It was thus no longer able to react upon the paradioxythiazin formed by the paramidophenol in order to condense it into paradioxytetraphenetrithiazin. The product of the reaction is constituted almost entirely of the paradioxythiazin.

I heat, for example, in an iron caldron provided with an agitator paramidophenol, eleven kilos; hydroquinone, eleven kilos; sulfur, three kilos two hundred grams. The solidification of the mass indicates, by the stoppage of the agitator, that the reaction is terminated.

The product is purified by solution in carbonate of soda. It is almost entirely composed of paradioxythiazin.

In order to obtain under the same conditions paramidoöxythiazin, I cause the sulfur to react upon a mixture of equal parts of paramidophenol, paraphenylenediamin, and hydroquinone.

Having now particularly described and ascertained the nature of my said invention and in what manner the same is to be performed, I declare that what I claim is—

1. The method of preparing coloring-matters which consists in heating with sulfur a mixture of paramidophenol and hydroquinone, substantially as described.

2. The method of preparing coloring-matters which consists in heating with sulfur a mixture of paramidophenol, paraphenylenediamin, and hydroquinone, substantially as described.

In testimony whereof I have signed this specification in the presence of two subscribing witnesses.

HENRI RAYMOND VIDAL.

Witnesses:
 EDWARD P. MACLEAN,
 ANTOINÉ ROUSSANNES.